United States Patent
Yamashita et al.

(10) Patent No.: US 6,324,332 B1
(45) Date of Patent: Nov. 27, 2001

(54) OPTICAL FIBER FIXING MEMBER, METHOD OF MANUFACTURING THE OPTICAL FIBER FIXING MEMBER, OPTICAL FIBER ARRAY, AND METHOD OF MANUFACTURING THE OPTICAL FIBER ARRAY

(75) Inventors: Teruo Yamashita; Masahiro Yoshida; Reikou Fukazaki; Yoshiatsu Yokoo, all of Tokyo (JP)

(73) Assignee: Hoyo Corporation, Tokyo (JP)

( * ) Notice: Subject to any disclaimer, the term of this patent is extended or adjusted under 35 U.S.C. 154(b) by 0 days.

(21) Appl. No.: 09/445,021

(22) PCT Filed: Jul. 31, 1998

(86) PCT No.: PCT/JP98/03426

§ 371 Date: Dec. 2, 1999

§ 102(e) Date: Dec. 2, 1999

(87) PCT Pub. No.: WO99/06865

PCT Pub. Date: Jan. 11, 1999

(30) Foreign Application Priority Data

Jul. 31, 1997 (JP) .................................................. 9-206562

(51) Int. Cl.$^7$ ...................................................... G02B 6/36
(52) U.S. Cl. .................................. 385/137; 65/102; 65/305
(58) Field of Search .................................. 385/134, 136, 385/137; 65/102, 106, 111, 305, 306

(56) References Cited

U.S. PATENT DOCUMENTS

| 5,323,481 | * | 6/1994 | Tokumaru et al. | ................... | 385/136 |
| 5,835,659 |   | 11/1998 | Ota et al. | ............................. | 385/137 |
| 6,134,371 | * | 10/2000 | Yoshida et al. | ...................... | 385/137 |

FOREIGN PATENT DOCUMENTS

| 63-113505 | * | 5/1988 | (JP) | ..................................... | 385/137 |
| 4-296802 |   | 10/1992 | (JP) . | | |
| 8-292332 |   | 11/1996 | (JP) . | | |
| 9-145948 |   | 6/1997 | (JP) . | | |
| 0 860 720 |   | 10/1996 | (WO) . | | |
| WO97/15850 |   | 1/1997 | (WO) . | | |

* cited by examiner

*Primary Examiner*—John D. Lee
(74) *Attorney, Agent, or Firm*—Oliff & Berridge, PLC

(57) ABSTRACT

An optical fiber fixing member having optical fiber engagement grooves 2 and peaks 5 between the engagement grooves 2 is configured as a unitary structure by molding. A preform G is pressed with a mold 21 such that the concavities 25 of the mold 21, which comprises convexities 26 and concavities 25 for the transfer of the engagement grooves 2 and the peaks 5, respectively, are filled with the preform G only partially. The shape of the convexities 26 of the mold 21 is transferred, yielding optical fiber engagement grooves 2 whose surfaces are mold transfer surfaces 6. Because the preform G fills the concavities 25 only partially, the peaks 5 between the optical fiber engagement grooves formed by the filling of the concavities 25 are free rounded surfaces 7 whose shape does not reflect the shape of the concave bottom portions 25a of the mold 21.

5 Claims, 12 Drawing Sheets

FIG. 6
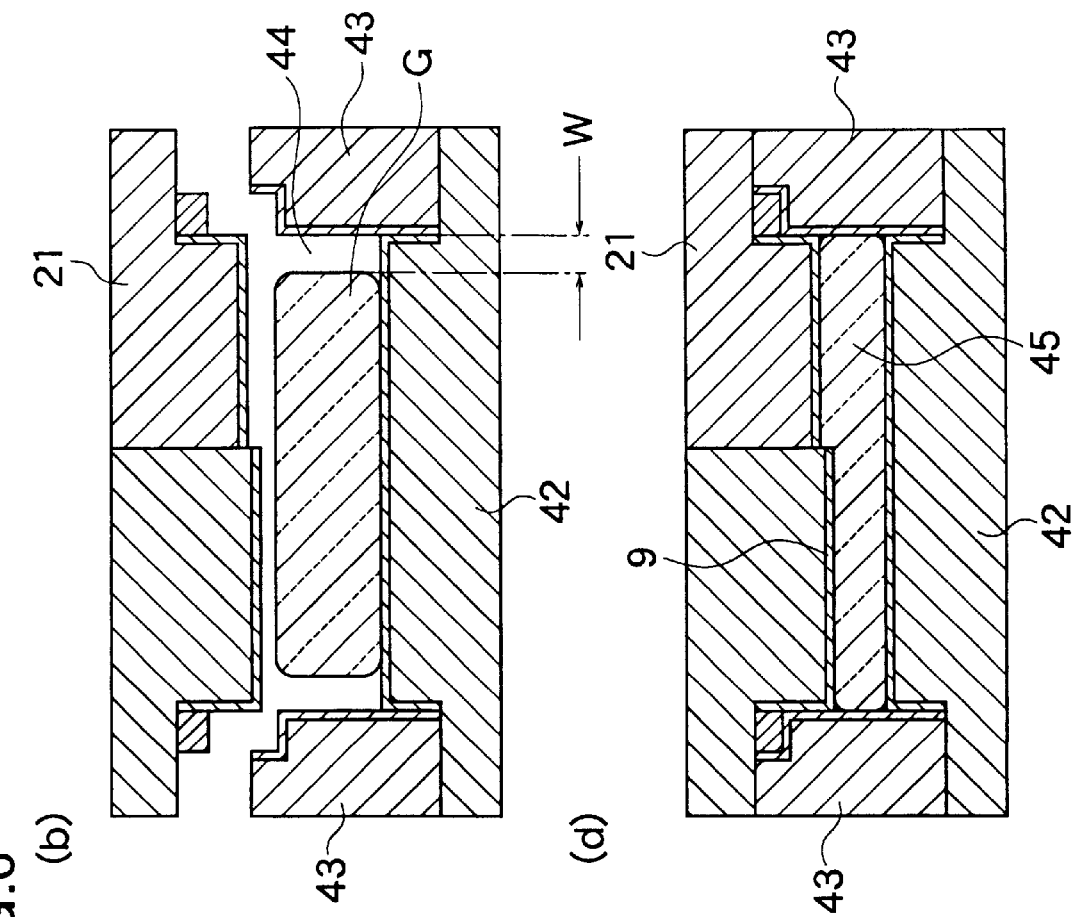
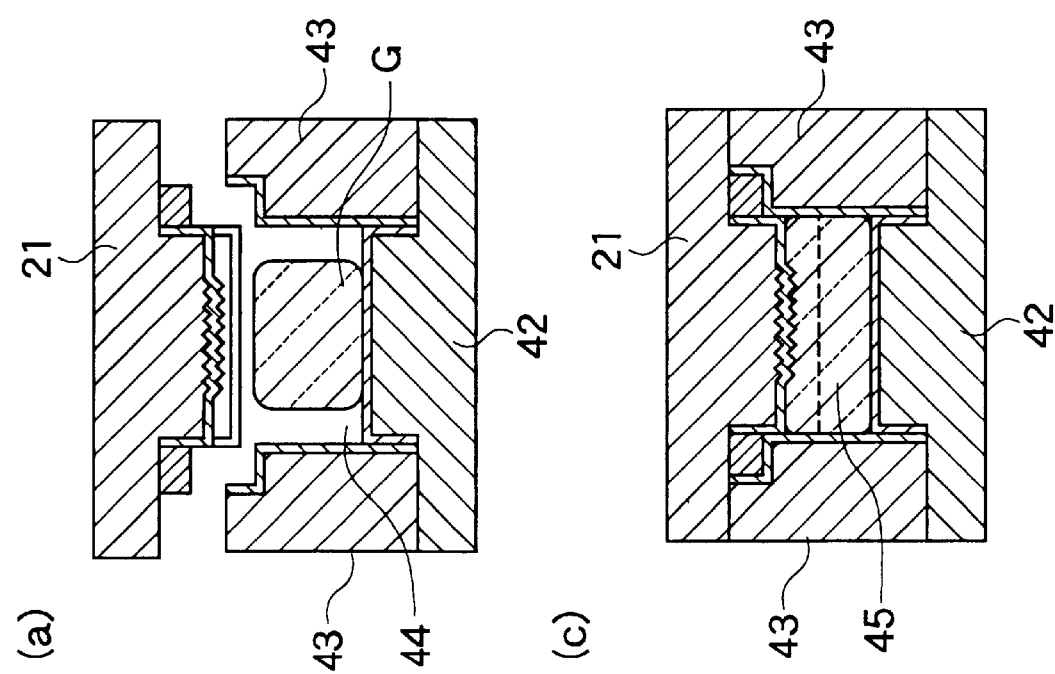

FIG.13

| Shape of molded article | Temperature of mold A (°C) * | Temperature of mold B (°C) ** | Molding pressure (kgf) | Molding time (sec) |
|---|---|---|---|---|
| Free surfaces are not formed on peaks or edges | 565~570 | 535~540 | 100~150 | >70 |
| Free surfaces formed over entire peaks (Fig.8) (free surfaces also formed along edges) | 558~564 | 529~534 | 70~120 | <70 |
| Free surfaces formed on portions of peaks near the end face located closer to optical connections or the end face opposite this end face (Figs.9,10) (free surfaces also formed at corner intersections (in areas where edges intersect each other) of molded article)*** | 560~565 | 532~540 | 90~130 | about 70 |

\*   Mold A : Mold having molding surfaces for molding optical fiber engagement grooves \*\*  Mold B : Mold located opposite mold A \*\*\* For example, the following method may be used to form free surfaces at designated locations. In Fig.6, increasing the interval W between the frame die and the preform causes free surfaces to be formed on the peaks near the end face located closer to optical connections, whereas reducing W causes free surfaces to be formed on the peaks near the end face opposite the end face located closer to optical connections. Free surfaces are formed on the peaks near the two end faces by keeping W intermediate between the two.

OPTICAL FIBER FIXING MEMBER, METHOD OF MANUFACTURING THE OPTICAL FIBER FIXING MEMBER, OPTICAL FIBER ARRAY, AND METHOD OF MANUFACTURING THE OPTICAL FIBER ARRAY

TECHNICAL FIELD

The present invention relates to an optical fiber fixing member for positioning and fixing the ends of an optical fiber, a method for manufacturing this optical fiber fixing member, an optical fiber array, and a method for manufacturing this optical fiber array, particularly by forming a unitary structure through molding.

BACKGROUND ART

In optical communications, light measurements, and other fields, members for positioning and fixing the ends of optical fibers are needed to form optical connections among a plurality of optical fibers or between a plurality of optical fibers and other elements (for example, optical waveguides for the branching of optical communications signals). Methods for manufacturing such optical fiber fixing members by press molding with good productivity and reproducibility have been used in recent years.

For example, Japanese Unexamined Patent Application HEI8-292332 (hereinafter abbreviated as "the Application") describes a method in which a press mold for the transfer of grooves designed to fix the ends of optical fibers is manufactured by grinding, and glass is press-molded with the aid of this mold, yielding an optical fiber fixing member. According to the Application, the resulting optical fiber fixing member is advantageous in that peak chipping and damage to the optical fibers to be fixed can be prevented because the fixing member can be rounded off such that the peaks between the fixing grooves have a specific radius of curvature in cross section.

The mold for the press molding of optical fiber fixing members described in the Application is fabricated by grinding, and the ground surfaces of this mold inevitably contain numerous minute irregularities. Peaks between the V grooves for engaging and laying out optical fibers are transfer-formed by the bottom portions of concavities in the mold, and because the transfer surfaces of the bottom portions of the concavities in the mold are formed as described above, irregularities due to surface roughness result, as do irregularities in the form of clearly visible folds.

With press molding, microscopic shapes are transferred in addition to the macroscopic shape of the mold. In particular, the aforementioned microscopic shapes are transferred with high accuracy in molding operations in which the shape of the mold is transferred with very high accuracy, such as near the optical fiber supports of optical fiber fixing members. Release films are sometimes formed on the transfer surfaces of molds, but the minute irregularities on the mold surfaces are transferred by the molds even in the presence of such release films.

Molded surfaces of optical fiber fixing members are therefore almost identical in texture (surface hardness, fold-like irregularities resulting from machining, surface warping, and the like) to the surfaces of molds, and minute irregularities are also formed on the surfaces of peaks between the V grooves of a molded article.

When optical fibers are assembled into an optical fiber array by being aligned in the V grooves and fixed in place by mechanical means or by adhesion, the optical fibers are aligned in the V grooves by being pressed against the walls of the V grooves, but when minute irregularities such as those described above are present on the peaks between the V grooves (with which the optical fibers are most likely to come into contact, particularly during pressing), the lateral surfaces of the optical fibers are damaged, and microcracks form.

In view of this, the invention described in the Application entails rounding off the peaks of optical fiber fixing members in cross section, and is thus useful in preventing optical fibers from undergoing comparatively extensive chipping, notching, or the like. It is unavoidable, however, that numerous minute irregularities still remain, making it impossible to prevent microcracks such as those described above from forming. It is also indicated in the Application that the peaks are rounded off by polishing, but such polishing involves corner chamfering and is incapable of removing the numerous minute irregularities on the peak surfaces.

A resulting drawback is that when light is transmitted by such an optical fiber array, the propagating light is scattered at locations where microcracks are present, resulting in increased transmission loss. In addition, even cracks that are small enough not to have a direct effect on reduced transmission loss eventually develop into larger cracks as a result of thermal stress due to variations in ambient temperature, bringing about an increase in transmission loss. At the worst, optical fibers break and completely lose their ability to function as a light-transmitting medium.

Another drawback is that because a molded article and a mold adhere to each other in the vicinity of optical fiber engagement portions during the formation of fixing grooves, the molded article exhibits poor release properties when it is removed from the mold following press molding, and a high fill factor is achieved by the molding material (material being molded) in relation to the volume of the mold cavity, making it more likely that molding burrs will form.

In addition, conventional optical fiber fixing members are molded by completely covering the molding surfaces of the mold with a molding material during the molding of the peaks between the optical fiber engagement grooves, so these peaks are mold transfer surfaces. Such optical fiber fixing members develop compression strain (stress) during the molding of the entire molding area of the optical fiber engagement grooves. A resulting disadvantage is that cracks form near the optical fiber engagement grooves, particularly in the bottom portions of the optical fiber engagement grooves, where stress is apt to concentrate for structural reasons.

An object of the present invention is to overcome the above-described drawbacks of prior art and to provide an optical fiber fixing member whose purpose is to ensure better release properties, to improve burr control properties, and to prevent transmission loss from being increased by the microcracking of the optical fiber, as well as to provide a method for manufacturing this member, an optical fiber array constructed using the aforementioned optical fiber fixing member, and a method for manufacturing this array.

DISCLOSURE OF THE INVENTION

The optical fiber fixing member of the first invention is an optical fiber fixing member having a plurality of optical fiber engagement grooves for positioning and fixing optical fibers, wherein at least parts of the peaks between the optical fiber engagement grooves are free surfaces. The term "free surface" refers to a surface of a molded article that has been molded without any contact with the molding surface of the mold during molding and without the transfer of the molding surface of the mold. In addition, the term "optical fiber engagement groove" refers to a comparatively deep valley and includes cases in which these valleys rise above the surface of the optical fiber fixing member because the peaks between the valleys are formed as convexities on the surface of the optical fiber fixing member, and cases in which the valleys lie below the surface of the optical fiber fixing member because the peaks are formed low above the surface of the optical fiber fixing member.

The free surfaces between optical fiber engagement grooves may be separated by at least one mold transfer surface (surface of a molded article obtained by the transfer of the molding surface of a mold) extending in the drawing direction of the optical fiber engagement grooves. This, for example, refers to cases in which optical fiber engagement grooves 2 (mold transfer surfaces) devoid of overlying optical fibers F are disposed between the optical fibers F (as shown in FIG. 1), and includes configurations (mold transfer surface/free surface/mold transfer surface) in which free surfaces are further interposed between the optical fiber engagement grooves 2 (mold transfer surfaces) devoid of overlying optical fibers F.

The optical fiber fixing member of the second invention is an optical fiber fixing member having a plurality of optical fiber engagement grooves for positioning and fixing optical fibers, wherein the surfaces of the optical fiber engagement grooves are formed by the mold transfer surfaces of a mold; and at least some of the surfaces of the peaks between the optical fiber engagement grooves are formed by free surfaces not in contact with the mold.

Forming the peak surfaces between the optical fiber engagement grooves from free surfaces not in contact with the mold prevents the unavoidable minute irregularities formed in the mold as a result of a manufacturing process involving grinding from being transferred to the peak surfaces. There is, therefore, no damage to optical fibers from the minute irregularities, and microcracking can be prevented.

In the invention described above, peaks formed from free surfaces should preferably be as described in any of (i) to (iv) below.

(i) The free surfaces extend all the way in the longitudinal direction of the peaks.

(ii) The portions of the peaks on the side of the end face located closer to optical connections are free surfaces (excluding case (i)).

(iii) The portions of the peaks on the side of the end face opposite the end face located closer to optical connections are free surfaces (excluding case (i)).

(iv) The portions of the peaks on the side of the end face located closer to optical connections and on the side of the end face opposite the end face located closer to the optical connections are free surfaces (excluding case (i)).

As used herein, the term "end face located closer to optical connections" refers to the end face of an optical fiber fixing member whose position corresponds to the position of the reception/transmission end faces of optical fibers when these optical fibers are laid out and fixed in optical fiber engagement grooves, yielding an optical fiber array.

Another feature of cases (ii) to (iv) is that when edges are formed as free surfaces, the resulting peaks are also free surfaces in areas other than those occupied by elements regarded as edges. These edges result from the intersection of surfaces that form optical fiber engagement grooves and an end face that is located closer to optical connections, or an end face opposite the end face located closer to the optical connections. This will be described using FIG. 2. The portions of peaks between the optical fiber engagement grooves 2 near the edges a and b of an optical fiber fixing member 1 are free surfaces when the edges, which are located at both ends of the optical fiber engagement grooves 2, are free surfaces. For optical fiber fixing members 1 in which at least one of the edges a and b is a free surface, optical fiber fixing members 1 in which free surfaces are limited to the portions of peaks 5 located near the free-surface edges lie outside the scope of the present invention.

Consequently, the optical fiber fixing members 1 included in the present invention are optical fiber fixing members in which peak surfaces are free surfaces in areas other than those occupied by the free-surface portions of edges when at least one of the following edges is a free surface: edge a, along which the end face 32 located closer to optical connections intersects the surface 31 on which optical fiber engagement grooves 2 are formed, and edge b, along which an end face 33 opposite the end face 32 located closer to the optical connections intersects the surface 31 on which the optical fiber engagement grooves 2 are formed. In more specific terms, the following arrangement corresponds to the present invention: an arrangement in which the edges are free surfaces, and the peaks are free surfaces in the areas indicated by arrow a in the direction away from straight line L, which is drawn along the boundary between the free surfaces and transfer surfaces of the edges, as shown in FIG. 3. The same applies to line L'.

Another feature of the above-described invention is that the peaks between the aforementioned optical fiber engagement grooves should preferably be rounded off in cross section. Peak chipping, damage to the optical fibers to be fixed, and microcracking can be prevented by rounding off the peaks between the optical fiber engagement grooves in this manner.

The above-described optical fiber fixing member should preferably be composed of glass. A member made of a hard material such as glass is very likely to damage optical fibers. It is therefore possible to achieve higher efficiency in preventing the existence or formation of microcracks.

The optical fiber array of the third invention comprises the optical fiber fixing member of the above-described invention, optical fibers secured in the optical fiber engagement grooves of this optical fiber fixing member, and a pressure plate for pressing down said optical fibers in the optical fiber engagement grooves, the aforementioned optical fiber fixing member, optical fibers, and pressure plate being fixedly configured as a unitary structure. Components can be connected with better reliability because it is possible to prevent light transmission loss from being increased by the microcracking of the optical fibers.

The method for manufacturing an optical fiber fixing member in accordance with the fourth invention is a method for manufacturing, by means of molding, an optical fiber fixing member having a plurality of optical fiber engagement grooves for positioning and fixing optical fibers, wherein a molding material is pressed by a mold provided with convexities and concavities corresponding to the aforementioned optical fiber engagement grooves and the peaks between these optical fiber engagement grooves such that the molding material is forced into the concavities of the mold; the shape of the convexities of the mold is transferred to the molding material; optical fiber engagement grooves whose surfaces are mold transfer surfaces are formed; the molding material is pressure-molded such that the material fills the concavities of the mold only partially; a state is maintained in which the shape of the bottom portions of the concavities in the mold is not transferred; and peaks are formed between the optical fiber engagement grooves such that the surfaces thereof are free surfaces.

Optical fiber fixing members whose peaks have free surfaces and whose optical fiber engagement grooves at the same time have mold transfer surfaces can be manufactured with ease merely by performing molding in conditions under which the molding material fills the concavities of the mold only partially during molding. In the process, the peaks between the optical fiber engagement grooves are rounded off because the molding material is forced into the concavities of the mold and the molding process is stopped midway during the rising of the material into the concavities. It is therefore easy to mold peaks whose surfaces are rounded off and which are prevented from creating microcracks in optical fibers due to the presence of minute irregularities.

With this method for manufacturing an optical fiber fixing member, it is preferable that a glass preform be used as the molding material and that an optical fiber fixing member made of glass be molded in a heated state. Optical fiber fixing members that satisfy the fine processing requirements of submicron precision can be mass-produced at a low cost by combining the molding technologies applicable to glass materials with low coefficients of thermal expansions and to the ultracompact precision lenses used in optical equipment.

The above-described method for manufacturing an optical fiber fixing member should preferably be such that the peak surfaces of the portions described in any of (i) to (iv) below are free surfaces.

(i) Peak surfaces extending all the way in the longitudinal direction of the peaks.

(ii) The peak surfaces on the side of the end face located closer to optical connections (excluding case (i)).

(iii) The peak surfaces on the side of the end face opposite the end face located closer to optical connections (excluding case (i)).

(iv) The peak surfaces on the side of the end face located closer to optical connections and on the side of the end face opposite the end face located closer to the optical connections (excluding case (i)).

The method for manufacturing an optical fiber array in accordance with the fifth invention comprises the steps of securing optical fibers in the grooves of an optical fiber fixing member having a plurality of optical fiber engagement grooves for positioning and fixing optical fibers; pressing the optical fibers in the optical fiber engagement grooves with a pressure plate; and fixedly configuring the optical fiber fixing member, optical fibers, and pressure plate as a unitary structure, wherein this method for manufacturing an optical fiber array is performed such that a molding material is pressed by a mold provided with convexities and concavities corresponding to the optical fiber engagement grooves and the peaks between the optical fiber engagement grooves to force the molding material into the concavities of the mold; the shape of the convexities of the mold is transferred to the molding material; optical fiber engagement grooves whose surfaces are mold transfer surfaces are formed; a state is maintained in which the molding material fills the concavities of the mold only partially; an optical fiber fixing member is fabricated by forming peaks between the optical fiber engagement grooves such that, of the surfaces thereof, the portions described in any of (i) to (iii) below are free surfaces; the optical fibers are sequentially laid out in the grooves in the direction from the end face located closer to optical connections toward the end face opposite the end face located closer to the optical connections, in such a way that the tips of the optical fibers extend sufficiently far beyond the end face of the optical fiber fixing member located closer to optical connections, in a state in which the tips of the optical fibers are inclined in relation to the optical fiber engagement grooves; and the lateral surfaces of the optical fibers are pressed and fixed with the pressure plate.

(i) Peak surfaces extending all the way in the longitudinal direction of the peaks.

(ii) The peak surfaces on the side of the end face located closer to optical connections (excluding case (i)).

(iii) The peak surfaces on the side of the end face located closer to optical connections and on the side of the end face opposite the end face located closer to the optical connections (excluding case (i)).

The method for manufacturing an optical fiber array in accordance with the sixth invention comprises the steps of securing optical fibers in the grooves of an optical fiber fixing member having a plurality of optical fiber engagement grooves for positioning and fixing optical fibers; pressing the optical fibers in the optical fiber engagement grooves with a pressure plate; and fixedly configuring the optical fiber fixing member, optical fibers, and pressure plate as a unitary structure, wherein this method for manufacturing an optical fiber array is performed such that a molding material is pressed by a mold provided with convexities and concavities corresponding to the optical fiber engagement grooves and the peaks between the optical fiber engagement grooves to force the molding material into the concavities of the mold; the shape of the convexities of the mold is transferred to the molding material; optical fiber engagement grooves whose surfaces are mold transfer surfaces are formed; a state is maintained in which the molding material fills the concavities of the mold only partially; an optical fiber fixing member is fabricated by forming peaks between the optical fiber engagement grooves such that, of the surfaces thereof, the portions described in any of (i) to (iii) below are free surfaces; the optical fibers are sequentially laid out in the grooves in the direction from the end face opposite the end face located closer to optical connections toward the end face located closer to the optical connections, in a state in which the optical fibers are inclined in relation to the optical fiber engagement grooves, and the tips of the optical fibers are at a distance from the engagement grooves; and the lateral surfaces of the optical fibers are pressed and fixed with the pressure plate.

(i) Peak surfaces extending all the way in the longitudinal direction of the peaks.

(ii) The peak surfaces on the side of the end face opposite the end face located closer to optical connections (excluding case (i)).

(iii) The peak surfaces on the side of the end face located closer to optical connections and on the side of the end face opposite the end face located closer to the optical connections (excluding case (i)).

BRIEF DESCRIPTION OF THE DRAWINGS

FIGS. 6 are process drawings illustrating a method for manufacturing an optical fiber fixing member in accordance with an embodiment with the aid of a mold for manufacturing optical fiber fixing members, where FIG. 6a is a front cross-sectional view prior to molding, FIG. 6b is a lateral sectional view of the same, FIG. 6c is a front cross-sectional view during molding, and FIG. 6d is a lateral sectional view of the same;

FIG. 7a depicts the initial phase of pressing, FIG. 7b the middle phase, and FIG. 7c the final phase.

FIG. 13 is a diagram illustrating the conditions for providing the peaks with free surfaces.

BEST MODE FOR CARRYING OUT THE INVENTION

Embodiments of the present invention will now be described.

Figure 1:
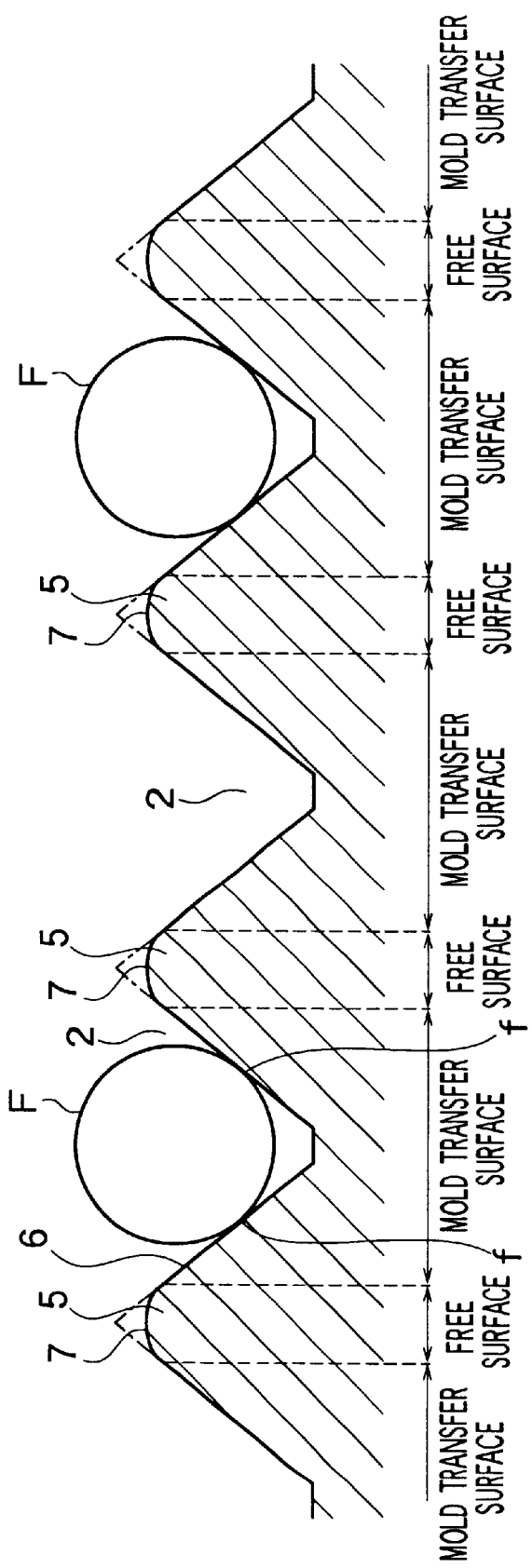
FIG. 1 is a diagram depicting a cross section near the optical fiber engagement grooves of an optical fiber fixing member according to an embodiment.
Figure 4:
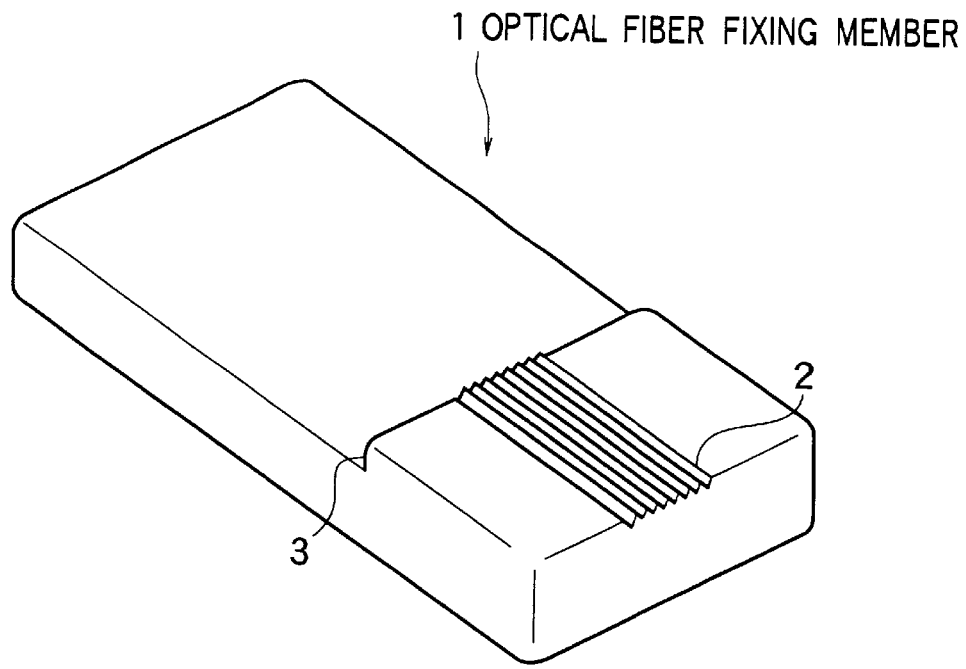
FIG. 4 is a schematic perspective view of an optical fiber fixing member pertaining to an embodiment.

The optical fiber fixing member of the present invention is a glass member provided with eight optical fiber engagement grooves and designed to form an eight-core optical fiber array for aligning and fixing eight optical fibers. The member is shaped as a block having a step 3, as shown in FIG. 4. The member is designed such that the pitch between the optical fibers is 250 $\mu$m when these optical fibers (diameter: 125 $\mu$m) are laid out and secured in the optical fiber engagement grooves 2. FIG. 1 is a cross section of the optical fiber fixing member 1 in the vicinity of the optical fiber engagement grooves 2. The cross section is perpendicular to the optical axes of optical fibers F secured in the optical fiber engagement grooves 2. The optical fiber engagement grooves 2 have generally V-shaped cross sections, and the opening angle of the V-shape is 70°. Peaks 5 for separating the engagement grooves from each other are formed between the optical fiber engagement grooves 2.

Whereas the surfaces of the optical fiber engagement grooves 2 (which support the lateral surfaces f of the optical fibers F when these fibers are secured) are mold transfer surfaces 6 transferred from the mold, the surfaces of the peaks 5, which are positioned between the engagement grooves 2, are composed of free surfaces 7 not in contact with the mold, and the cross sections thereof are generally circular arcs having a certain degree of roundness. The width of the free surfaces 7 in the aforementioned cross sections should preferably be 10–80 $\mu$m, and the radius of curvature of the aforementioned circular arcs should be 25–50 $\mu$m. It is particularly preferable for both the width and the radius of curvature to fall within the aforementioned ranges. When the width of the free surfaces is less than 10 $\mu$m, the release properties of the molding are adversely affected, and molding burrs tends to form. When the width exceeds 80 $\mu$m, free shrinkage of glass increases, and molding accuracy decreases. When the radius of curvature is less than 25 $\mu$m, a wider surface area is occupied by minute irregularities, making it more likely that the lateral surfaces of fibers will be damaged when the fibers are arranged and fixed in place. When the radius exceeds 50 $\mu$m, the fibers extend further beyond the top of the peaks between the V grooves, adversely affecting durability or the polishing characteristics of end faces.

A material with a low yield point and a low coefficient of thermal expansion suited to precision molding may be used as the glass material for the optical fiber fixing member. A material with high UV transmissivity is preferred because of the use of a UV-curing adhesive.

Figure 5:
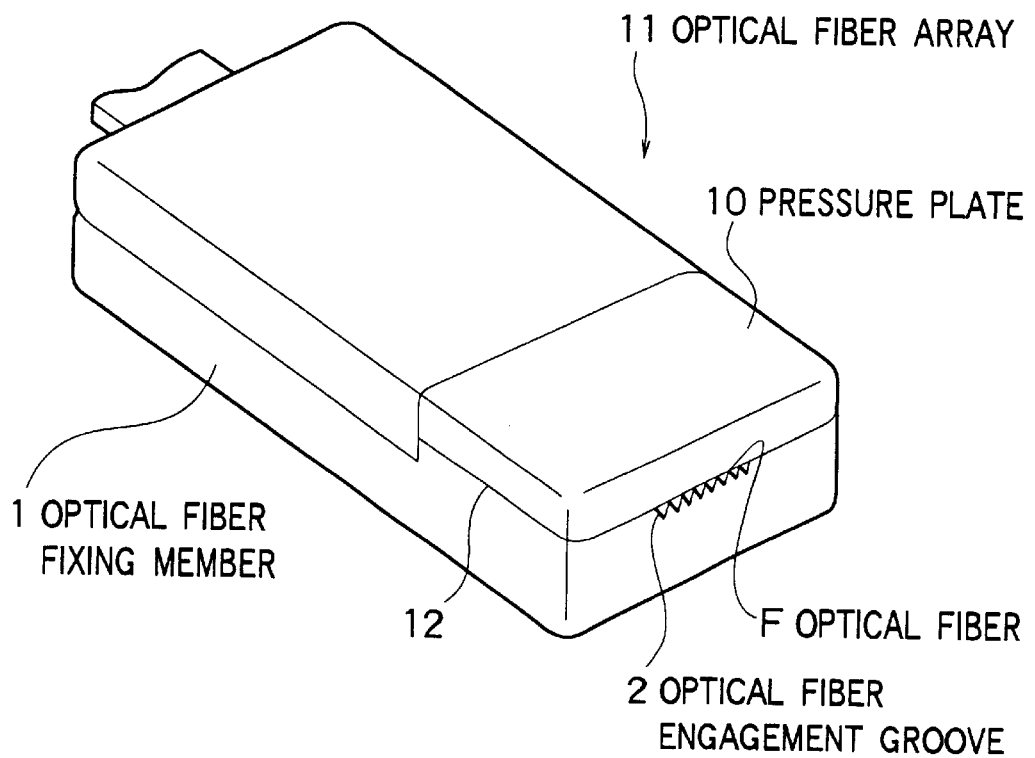
FIG. 5 is a schematic perspective view of an optical fiber array pertaining to an embodiment.

Single-mode fibers F made of quartz glass were aligned in the optical fiber engagement grooves 2 of such an optical fiber fixing member, pressed down with a pressure plate 10, and fixed in place with a UV-curing adhesive 12 while exposed to UV light. The pressure plate 10 and the end face of the optical fiber fixing member 1 facing the optical connections were polished at the same time together with the end faces of the optical fibers thus fixed, yielding an eight-core optical fiber array 11 such as that shown in FIG. 5. Pairs of optical fiber arrays 11 thus obtained were abutted with each other along their end faces and fixed in place after the optical axes of the corresponding pairs of optical fibers F were aligned. Light was then passed through the other end of an optical fiber, and this light was transmitted into a connected optical fiber. Transmission loss was measured, but no increase in transmission loss due to microcracking was observed. The ambient temperature was then varied between –40 and +85° C. over a course of about 1000 cycles, but no increase in transmission loss or optical fiber breakage was observed at all.

Such an optical fiber array was disassembled, and the lateral surfaces fixed in the optical fiber engagement grooves for optical fibers were examined under an optical or electron microscope. It was found that no microcracks had formed as a result of alignment and fixing. When an optical fiber fixing member is composed of glass (as in the case of this embodiment), this material is harder than a material such as resin or the like, making it highly likely that the lateral surfaces of the optical fibers will be damaged by the minute irregularities. The present invention is therefore capable of demonstrating a more remarkable effect with respect to glass products than when these products are composed of a material (such as resin) softer than that used for optical fibers.

Following is a description of a method for manufacturing the optical fiber fixing member of the present embodiment with the aid of a mold.

As shown in FIG. 6, an upper die 21 for forming surfaces that contain the optical fiber engagement grooves of the optical fiber fixing member, a lower die 42 that faces the upper die 21, and a frame die 43 for forming the lateral surfaces of the optical fiber fixing member are assembled together; and a glass preform G located in a cavity 44 defined by the molding dies 21, 42, and 43 is molded in a heated state. The molding surfaces of the molding dies 21, 42, and 43 are covered with release films. The glass preform G is placed in the cavity 44 of the mold, pressure is applied while the mold is heated, and the glass preform G is molded under molding conditions in which the shape of the peaks of the molded article falls within a range suited to free surfaces. Molding is followed by cooling to room temperature and a concurrent pressure reduction, and the molded article 45 is then taken out of the mold. It is also possible to use a die 21 as the lower die, to use a die 42 as the upper die, and to perform molding by placing the glass preform G on the molding surface of the lower die 21 formed into a unitary structure with the frame die 43.

Figure 7:
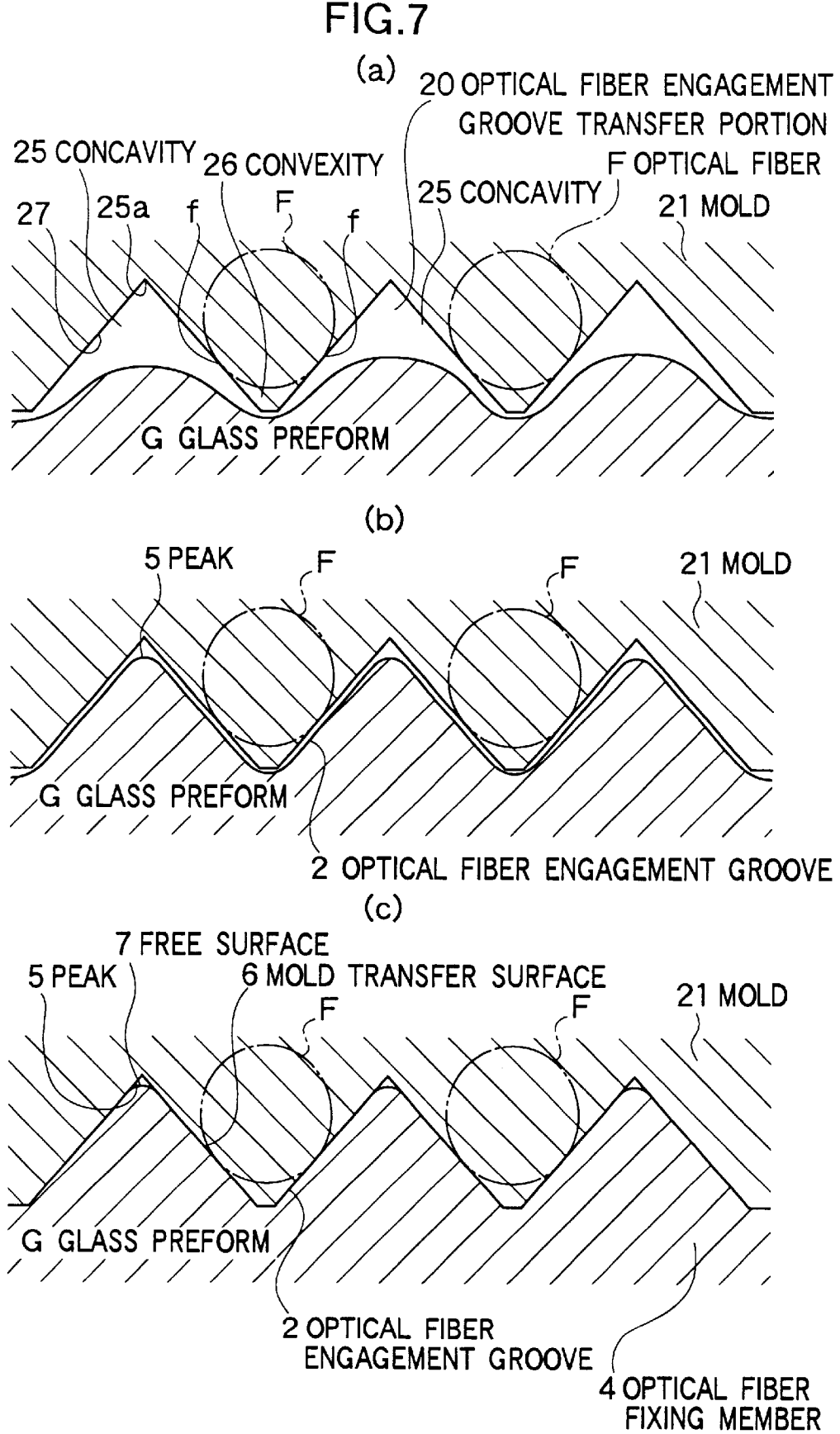
FIGS. 7a–7b are diagrams depicting the manner in which areas in the vicinity of optical fiber engagement grooves are molded with the aid of a mold having transfer portions for optical fiber engagement grooves in accordance with the manufacturing method pertaining to an embodiment, where

FIG. 7 is a cross section of the portion molded by transferring the optical fiber engagement grooves of the upper die 21. This is a mold cross section that corresponds to the cross section of an optical fiber fixing member shown in FIG. 1 and that depicts the manner in which the glass preform G fills the concavities 25 serving as the transfer portions 20 of the optical fiber engagement grooves during pressing. The transfer portions 20 of the optical fiber engagement grooves consist of concavities 25 and convexities 26. Although the concavities 25 of the mold 21 describe acute angles in FIG. 7, the actual cross section of a bottom portion 25a has a shape resembling that of a circular arc with a radius of curvature of no more than 20 μm. The concavities 25 between the convexities 26 of the mold 21 are formed by grinding, and minute irregularities are observed to have formed on the transfer surfaces (ground surfaces) 27.

In the present embodiment, however, optical fiber engagement portions having at least engagement grooves 2 and peaks 5 are formed while the glass preform G fills the aforementioned concavities 25 only partially by selecting molding conditions in an appropriate manner, and molding is performed such that the surfaces that support the lateral surfaces f of the optical fibers are mold transfer surfaces 6.

Specifically, the glass preform G is pressed by the mold 21 such that the glass preform G fills the concavities 25 of the mold 21 provided with the convexities 26 and concavities 25 for transferring the peaks 5 located between the optical fiber engagement grooves 2. In the pressing step, the shape of the convexities 26 of the mold 21 is transferred to the glass preform G, forming optical fiber engagement grooves 2 and making their surfaces mold transfer surfaces 6. Pressure forming is performed under molding conditions (temperature, pressure, molding time, ratio of mold capacity and preform volume, and the like) in which the glass preform G fills the concavities 25 of the mold 21 only partially, a state is maintained in which the shape of the bottom portions 25a of the concavities 25 in the mold 21 is not transferred, and peaks 5 are formed between the optical fiber engagement grooves 2 such that the surfaces thereof are free surfaces 7. The minute irregularities of the mold 21 are not transferred because the free surfaces 7 of the peaks 5 between the optical fiber engagement grooves 2 thus molded are not in contact with the mold 21. In addition, the radius of curvature of the peaks 5 of the molded article is always greater than the radius of curvature of the concavities 25 of the mold 21.

The molded article is taken out of the mold 21 following molding, but because the glass preform G fills the concavities 25 of the mold 21 only partially, the molded article can be taken out of the mold 21 using less force than in the case of conventional molding.

Another feature is that when the glass preform G is molded such that free surfaces 7 are formed between adjacent optical fiber engagement grooves 2, the glass preform G fills the concavities 25 of the optical fiber engagement groove transfer portions 20 of the mold 21 only partially, preventing the mold 21 and the molded article from adhering to each other near the optical fiber engagement grooves 2. The release properties of the molded article are therefore improved during the removal of the molded article from the mold 21 following molding.

Yet another feature is that when the fill factor of the glass preform G in relation to the volume of the cavity in the mold 21 is kept low (as in the molding process described above), the offset of the preform position in relation to the mold 21 increases, as does the surplus mold capacity for absorbing excess preform G, making it less likely that the glass preform G will penetrate into the gaps of the mold 21, and broadening the range of burr-less molding conditions (conditions under which molding can be conducted without the accompanying burring). It is also possible to broaden the range of molding conditions under which constant results are obtained for the accuracy of the transfer surfaces 27 of the optical fiber engagement groove transfer portions 20 according to the requirements of high-accuracy transfer molding, and for the accuracy of the intervals between the optical fiber engagement grooves 2. This is because the free surface or the strain-absorbing excess mold capacity increases when the molded article and the mold 21 undergo contraction in the cooling step of the molding process.

Breakage of the molded article can thus be prevented due to improvements in release properties and burr control properties. In addition, having free surfaces 7 is preferred from the standpoint of preventing release films from peeling off from the mold 21 during repeated molding.

Another feature is that because the glass preform G fills the concavities 25 of the optical fiber engagement groove transfer portions 20 of the mold 21 only partially, the surfaces of the concave bottom portions 25a do not function as mold transfer surfaces, and the form accuracy of the peaks 5 between the optical fiber engagement grooves 2 of the molded article does not depend any longer on the form accuracy of the concave bottom portions 25a of the mold. It is therefore possible to increase the tolerance of the form accuracy of the concave bottom portions 25a of the mold (particularly the tolerance of the radius of curvature of the concave bottom portions 25a, as viewed in a cross section perpendicular to the drawing direction of the concavities 25), facilitating the grinding of available molds 21. Because a mold can be fabricated by less complicated machining, a method for manufacturing optical fiber fixing members with high productivity can be provided conjointly with the above-described effect of preventing the peeling of release films, the effect of preventing breakage of molded articles, and the like. The preform of the present invention is not limited to glass. For example, plastics may also be used, provided they can be molded with high accuracy.

Another feature of this embodiment is that peaks are allowed to shrink freely during cooling and that shrinkage strain (stress) can be reduced during the molding of the entire molded portion of optical fiber engagement grooves by performing the molding process such that the peaks between the optical fiber engagement grooves remain free surfaces. As a result, it is possible to reduce the cracking and other types of damage occurring during thermal shock tests or the like in areas adjacent to the optical fiber engagement grooves, and particularly in the bottom portions, where stress is apt to concentrate because of structural factors.

Figure 2:
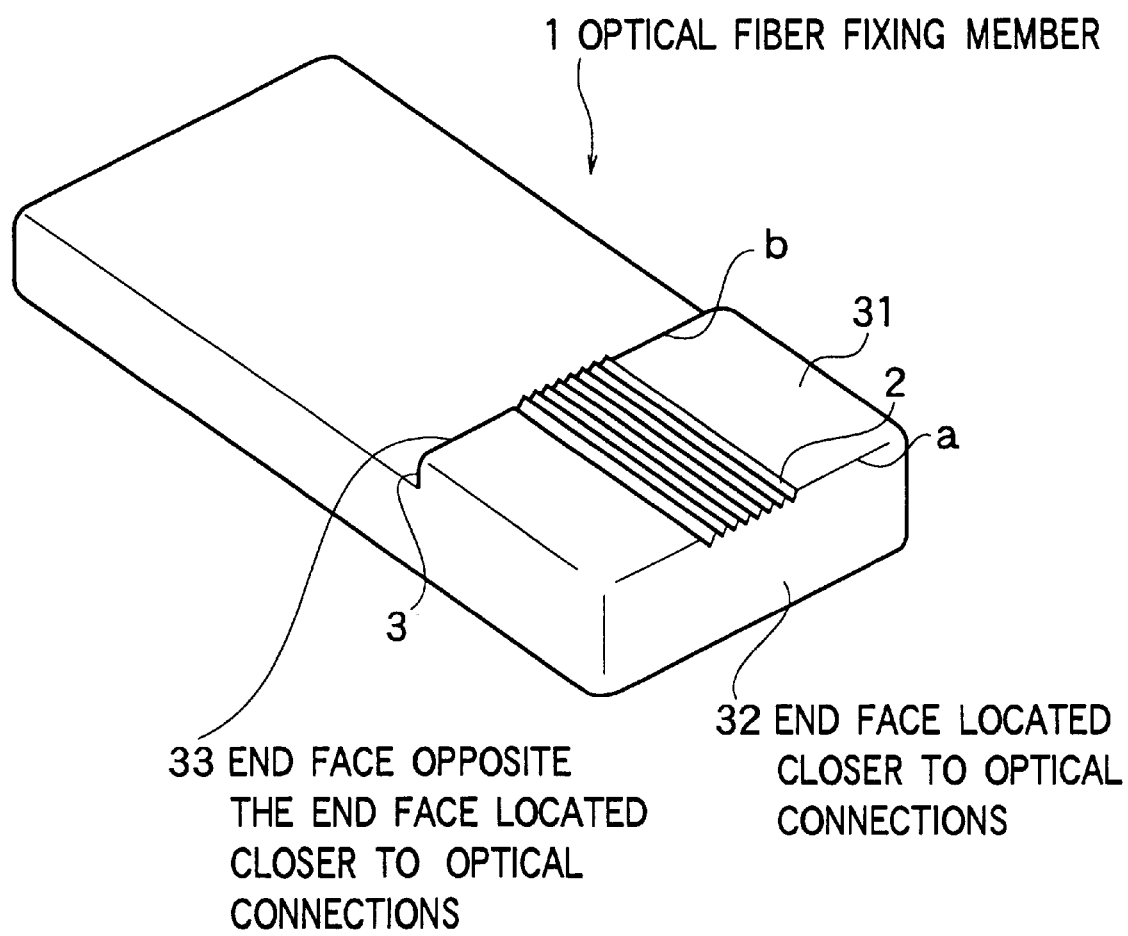
FIG. 2 is a schematic perspective view of an optical fiber fixing member according to an embodiment.
Figure 3:
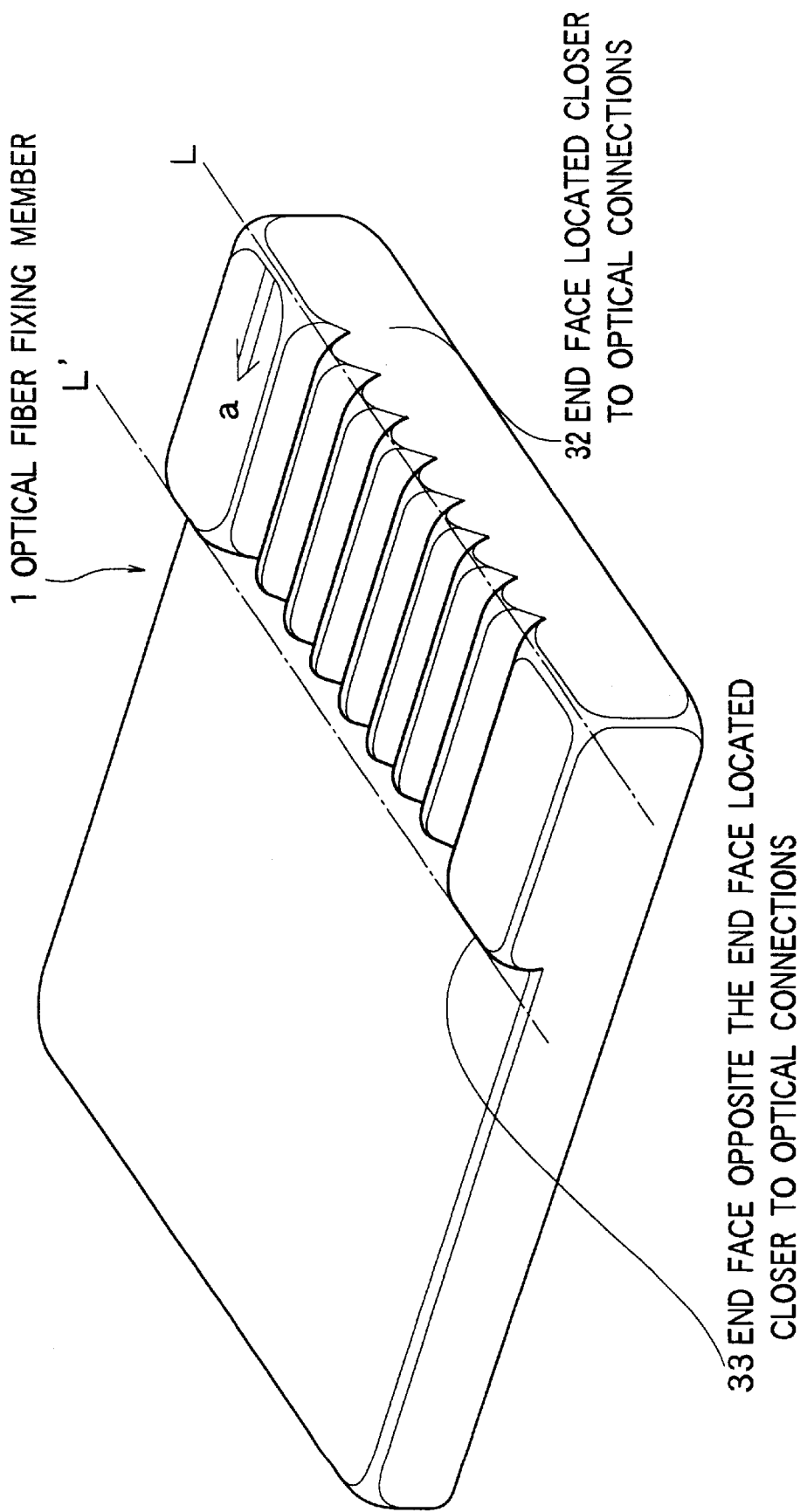
FIG. 3 is a perspective view of an optical fiber fixing member in which free surfaces form the edges thereof and extend all the way in the longitudinal direction of the peaks between V grooves.

In addition, the edges a and b (portions where surfaces intersect each other) of the optical fiber fixing member can be formed by free surfaces because molding is performed such that the peaks between the optical fiber engagement grooves are free surfaces (FIG. 2). Burring along the edges of the optical fiber fixing member can be prevented by making these edges into free surfaces. Release properties can be further improved, and damage to the molded article, the mold, and the release films during the release step can be reduced by performing molding in such a way that edges (in addition to peaks) are composed of free surfaces.

A study was subsequently conducted into the effects of forming free-surface portions at various locations in the longitudinal direction of peaks.

The optical fiber fixing member of the present invention includes the following aspects.

Figure 8:
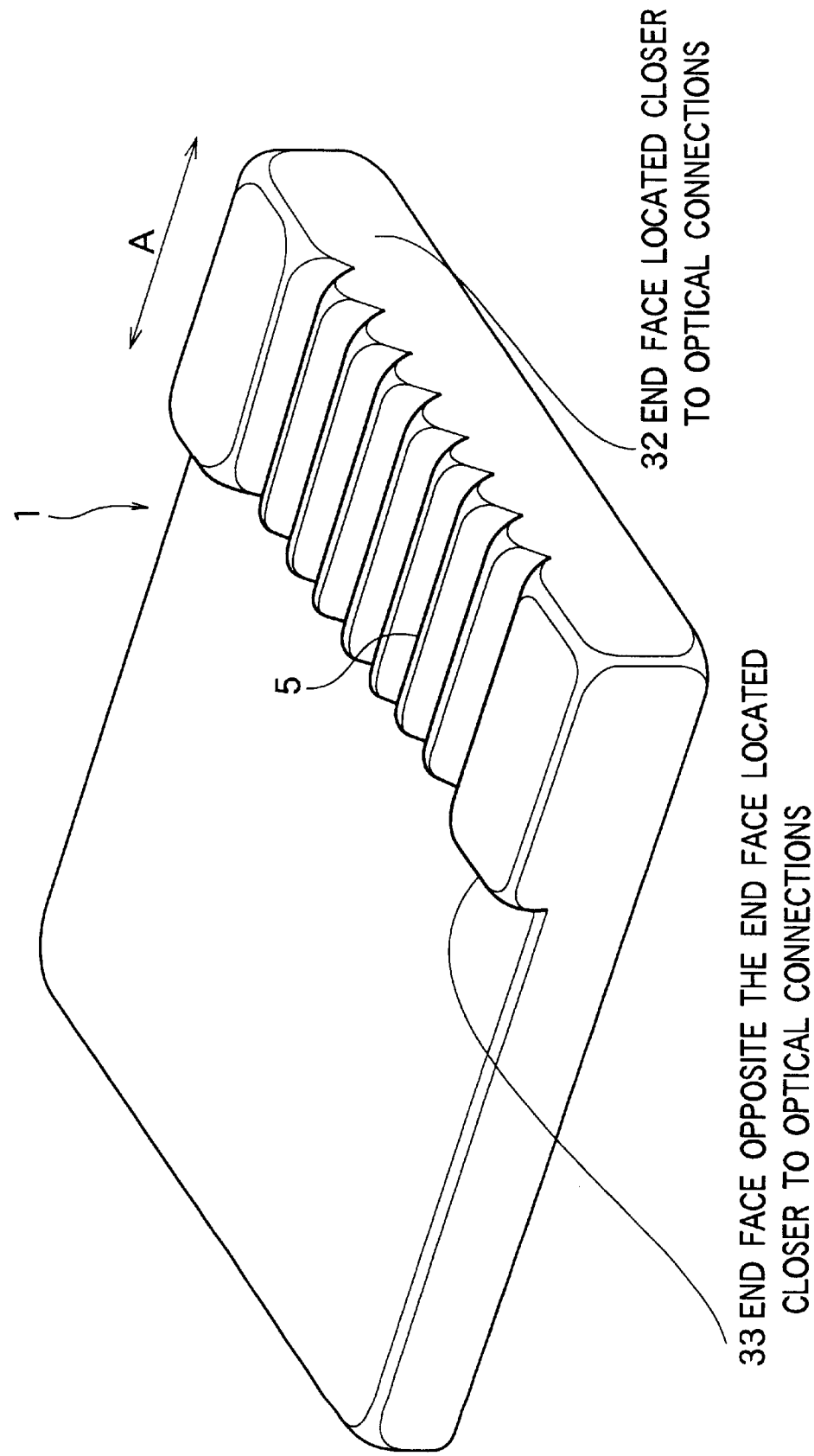
FIG. 8 is a perspective view of an optical fiber fixing member in which free surfaces form the edges thereof and extend all the way in the longitudinal direction of the peaks between V grooves.

(1) Free surfaces constitute peak surfaces all the way in the longitudinal direction of peaks 5 (symbol A in FIG. 8).

Figure 9:
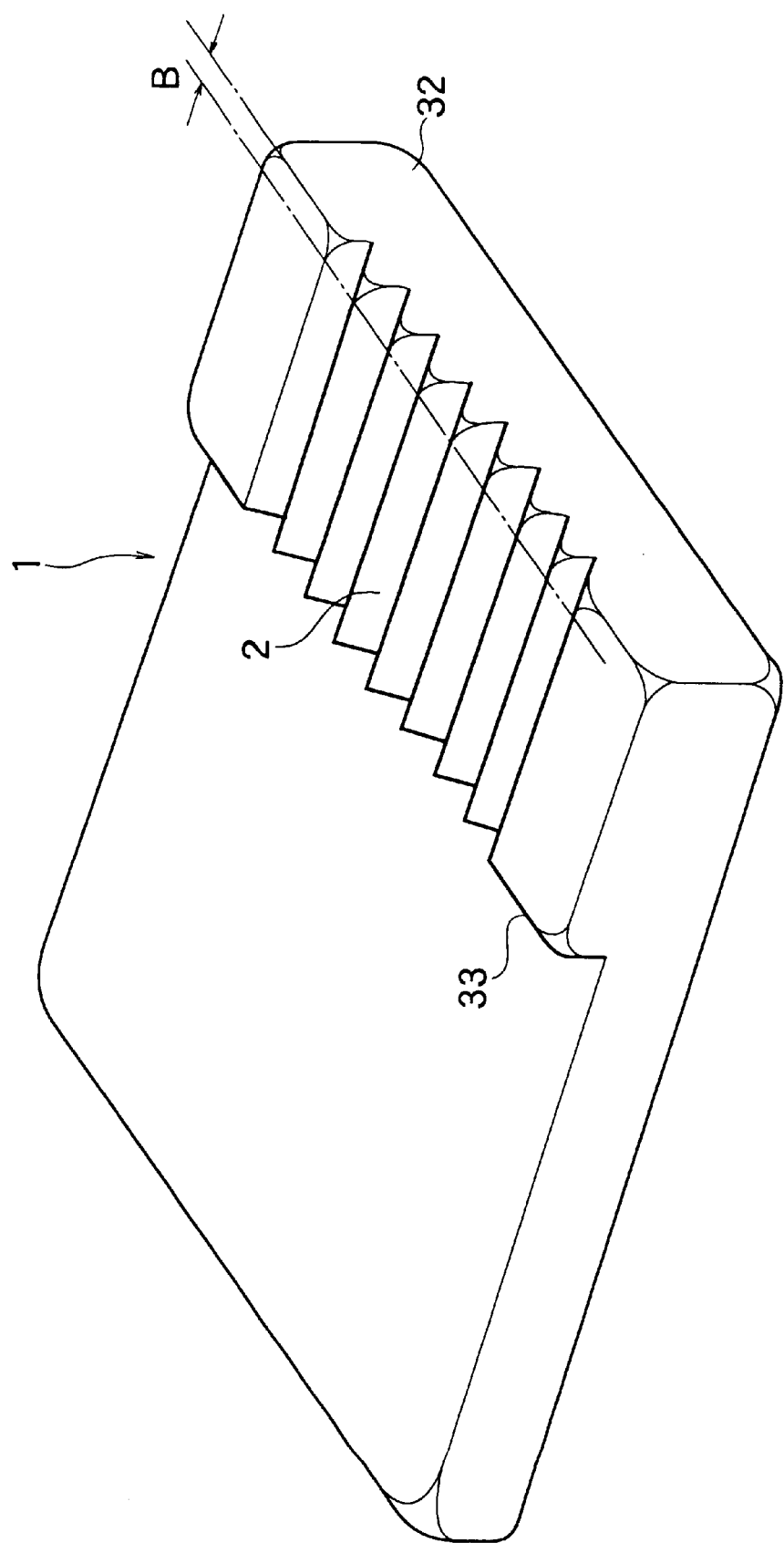
FIG. 9 is a schematic perspective view of an optical fiber fixing member in which free surfaces form the tips of the peaks between V grooves and the intersecting portions of the tip corners.

(2) Free surfaces are limited to the portions of the peaks lying along that end face 32 of an optical fiber fixing member 1 which is located closer to optical connections, that is, along the end face through which light enters optical fibers when these optical fibers are disposed in optical fiber engagement grooves 2 (symbol B in FIG. 9).

Figure 10:
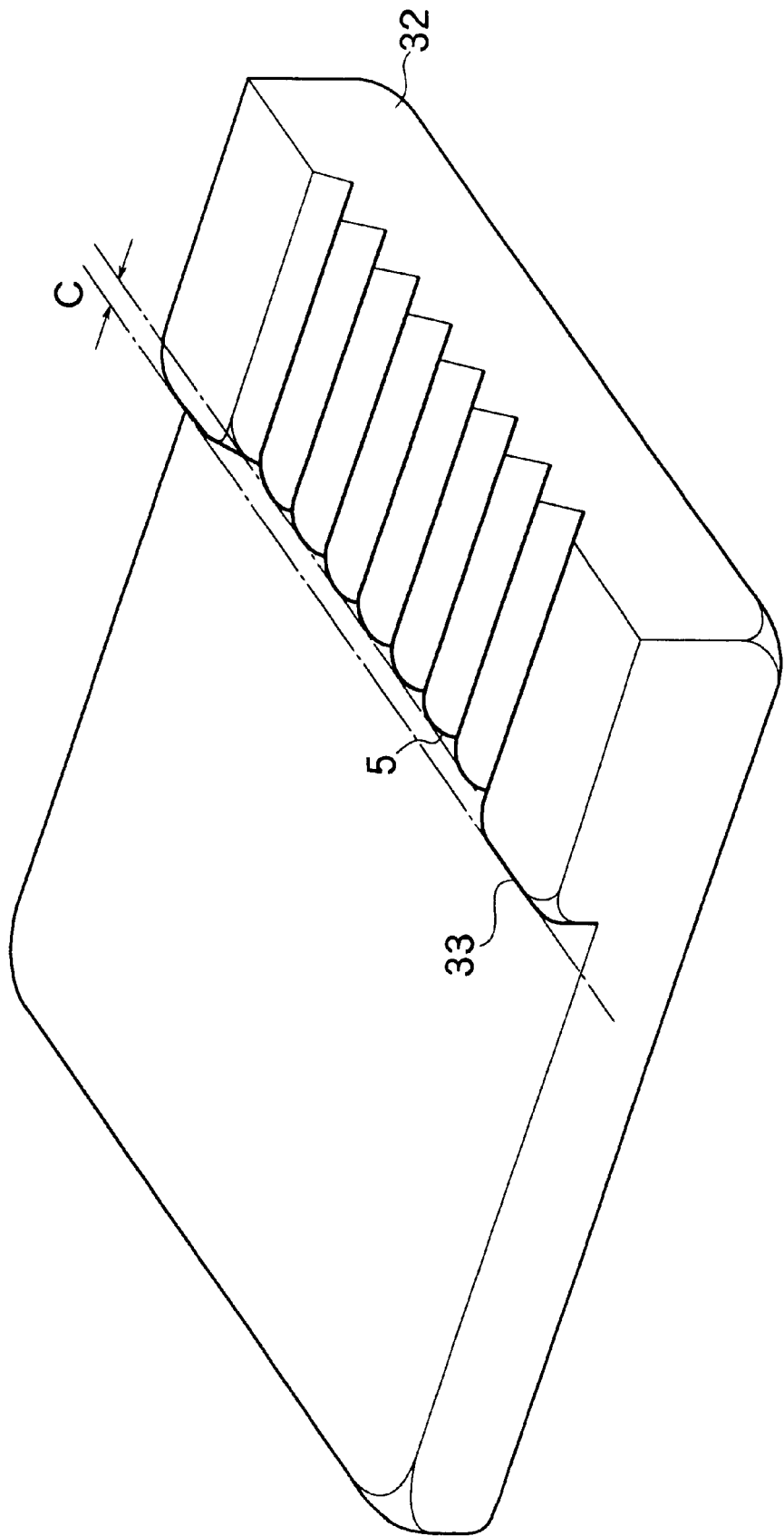
FIG. 10 is a schematic perspective view of an optical fiber fixing member in which free surfaces form the back ends of the peaks between V grooves and the intersecting portions of the back-end corners.

(3) Free surfaces are limited to the portions of peaks 5 facing an end face 33 opposite the end face 32 located closer to optical connections (symbol C in FIG. 10).

Figure 11:
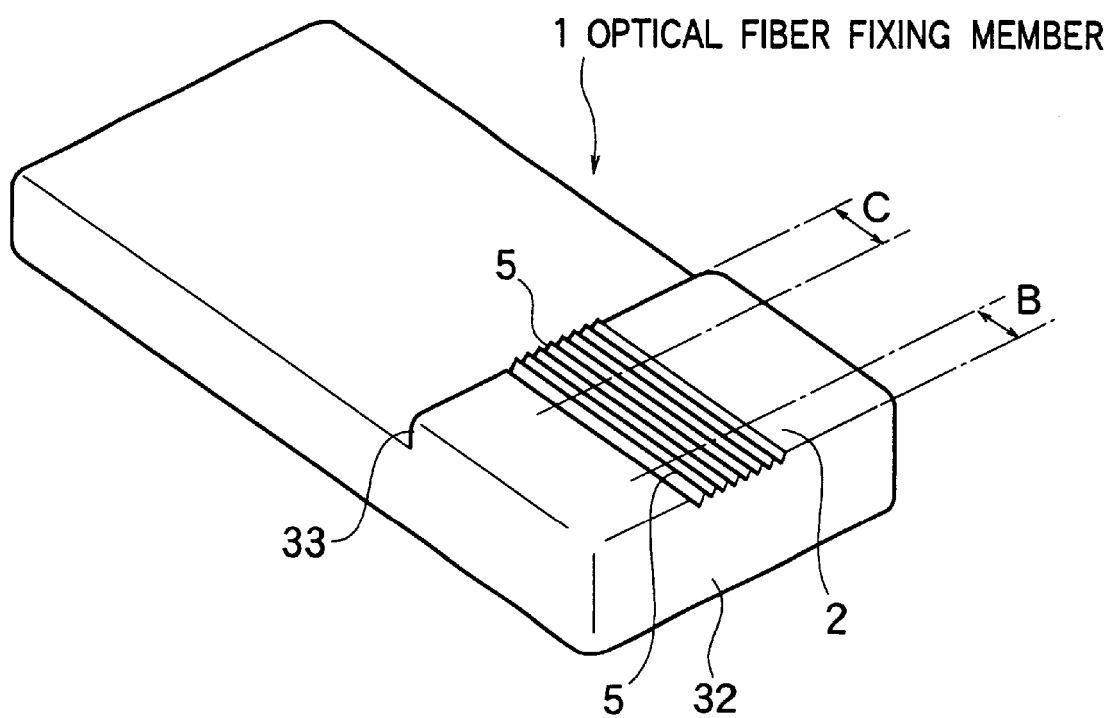
FIG. 11 is a schematic perspective view of an optical fiber fixing member in which free surfaces form the front and back ends of the peaks between V grooves.

(4) Free surfaces are limited to the portions of peaks 5 that face the end face 32 located closer to optical connections and that face the end face 33 opposite the end face 32 located closer to the optical connections (symbols B and C in FIG. 11).

In each aspect, release is easier to achieve than when the peak portions along the end face located closer to optical connections and the peak portions along the end face opposite the end face located closer to optical connections are not free surfaces, and only the middle portions of the peaks are free surfaces. Another feature of these aspects is that the formation of burrs in areas where the optical fiber engagement grooves come into contact with the edges of the molded article can be prevented because the peak portions near the edges are free surfaces.

The above-described aspects (1)–(4) of free surfaces are also advantageous when an optical fiber array is fabricated using the above-described optical fiber fixing member. A description follows. The following two methods may be used to prevent the end faces of optical fibers from being damaged when these optical fibers are laid out and secured in optical fiber engagement grooves.

(A) According to the first method, optical fibers are sequentially laid out and secured in the optical fiber engagement grooves in such a way that the tips of the optical fibers extend sufficiently far beyond the end face located closer to optical connections and that the optical fibers are held at an incline and are placed into the optical fiber engagement grooves from the side of the end face located closer to the optical connections.

Figure 12:
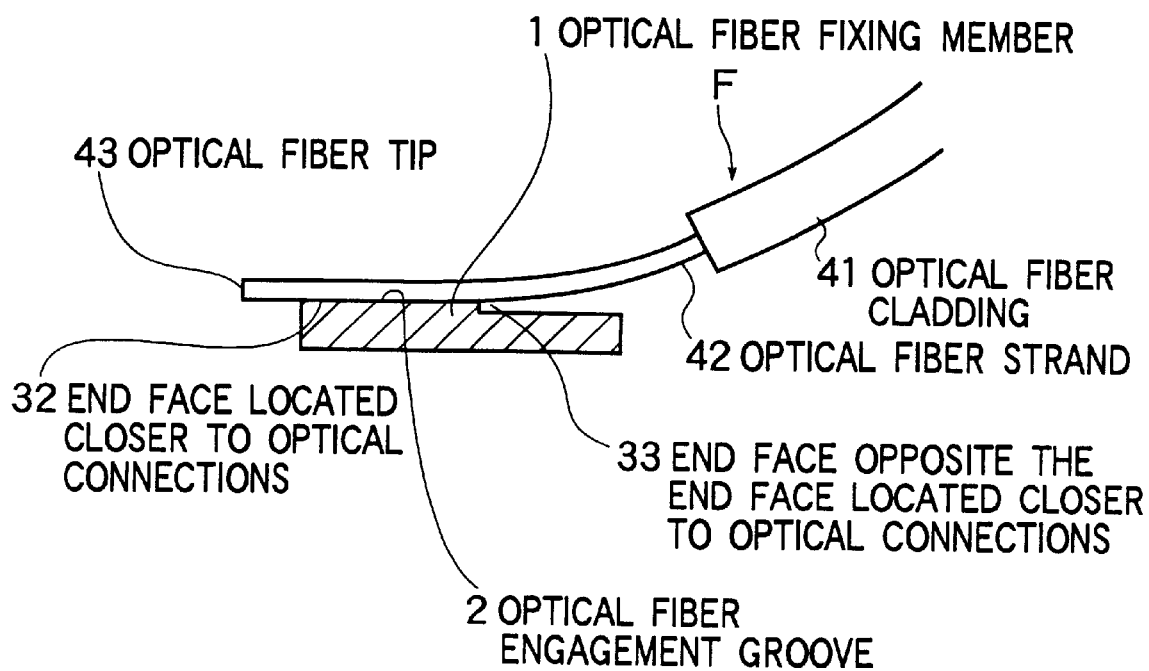
FIG. 12 is a diagram illustrating an example of a method for securing optical fibers in the optical fiber engagement grooves of an optical fiber fixing member.

Specifically, as shown in FIG. 12, an optical fiber F is inclined in relation to an optical fiber engagement groove 2, an optical fiber strand 42 is first inserted into the optical fiber engagement groove 2 from the side of the end face 32 located closer to optical connections while the tip 43 of the optical fiber is extended beyond the end face 32 located closer to the optical connections, and the optical fiber strand 42 is then gradually introduced into the engagement groove 2. The optical fiber strand 42 is gradually slid along the optical fiber engagement groove 2 toward the end face 32 located closer to the optical connections until the end near the tip portion of the cladding 41 of the optical fiber presses against, or moves close to, the end face 33 opposite the end face 32 located closer to the optical connections. The lateral surfaces of the optical fiber are then pressed and fixed in place with a pressure plate, yielding an optical fiber array.

(B) According to the second method, an optical fiber is gradually laid out and fixed in an optical fiber engagement groove in such a way that this optical fiber is placed into the groove in the direction from the portion of the optical fiber engagement groove facing the end face opposite the end face located closer to optical connections (in the direction toward the end face located closer to the optical connections) while the tip of the optical fiber is kept at a distance from the optical fiber engagement groove. In this method, the optical fiber strand 42 is gradually inserted into the engagement groove 2 in the direction opposite that in FIG. 12, that is, from the end face 33 opposite the end face 32 located closer to the optical connections toward the end face 32 located closer to the optical connections.

In (A) above, the lateral surfaces of optical fibers are first brought into contact with the end faces of the optical fiber engagement grooves located closer to optical connections. Irrespective of the aspect assumed by the above-described free surfaces (1), (2), or (4) in the optical fiber fixing member used in this case, the lateral surfaces of the optical fibers can be easily accommodated by the optical fiber engagement grooves because the portions of the peaks in the vicinity of the optical fiber engagement grooves that first come into contact with the lateral surfaces of the optical fibers are free surfaces. In addition, microcracking or another type of damage is less likely to occur when the lateral surfaces of the optical fibers come into contact with the peaks between the optical fiber engagement grooves because these peaks are free surfaces.

In (B) above, the lateral surfaces of the optical fibers are first brought into contact with those end faces of the optical fiber engagement grooves which are opposite the end faces located closer to optical connections. The portions of the peaks located in the area where the optical fibers are first inserted should preferably be free surfaces. It is even more preferable for the edges of the optical fiber fixing member in the area of initial contact with the optical fibers to be composed of free surfaces. Irrespective of the aspect assumed by the free surfaces (1), (3), or (4) in the optical fiber fixing member used in this case, the lateral surfaces of the optical fibers can be easily accommodated by the optical fiber engagement grooves because the portions of the peaks in the vicinity of the optical fiber engagement grooves that first come into contact with the lateral surfaces of the optical fibers are free surfaces. In addition, microcracking or another type of damage is less likely to occur when the lateral surfaces of the optical fibers come into contact with the peaks between the optical fiber engagement grooves because these peaks are free surfaces.

Aspects (1)–(4) above are therefore preferred. In the particular case of aspects (2)–(4), peak sections composed of transfer surfaces and peak sections composed of free surfaces are distributed in the longitudinal direction of the peaks, and the radius of curvature Of the peaks changes continuously in the longitudinal direction of the peaks.

Optical fibers can therefore be laid out smoothly when they are arranged and secured in optical fiber engagement grooves by a method such as A or B above. In addition, the radius of curvature of the peaks is reduced at least near the locations at which optical fibers are first placed in the grooves during their gradual placement, providing an arrangement that can prevent an optical fiber already received by an optical fiber engagement groove from slipping out of the optical fiber engagement groove when method A or B is carried out.

Furthermore, the molding material is deformed to a large extent and residual strain is likely to form near the edges of a molded article obtained by molding, so adopting free surfaces for the peaks in the areas near the edges as in aspects (1)–(4) above is preferred from the standpoint of achieving stress relaxation near the optical fiber engagement grooves and reducing the damage to the optical fiber fixing member. Adopting free surfaces for the edges in contact with optical fiber engagement grooves is particularly preferred for reducing the damage to the optical fiber fixing member because of a more pronounced stress relaxation effect.

As noted above, mold temperature, molding pressure, and molding time are some of the conditions that allow peaks to be provided with free surfaces, that is, some of the parameters that control the formation of the free surfaces. FIG. 13 is a diagram illustrating the shape attributes (peak, edge, angular portion) of a molded article corresponding to various parameters. The glass used in this case contains the following glass components: 3–30 wt % $SiO_2$, 20–40 wt % $B_2O_3$, 40–55 wt % ZnO (excluding 40 wt %), 0–15 wt % MgO, 0–10 wt % CaO, 0–10 wt % SrO, 0–10 wt % BaO, 0–20 wt % PbO, 40–55 wt % ZnO+MgO+CaO+SrO+BaO+PbO (excluding 40 wt %), 0.5–10 wt % $Al_2O_3$, and 0–7 wt % $Li_2O$. The content of the aforementioned glass components is 75 wt % or higher. The glass that can be used in the present invention is not limited to the one described above, however. These conditions change with the use of a different molding apparatus or the like, and must thus be customized for the particular apparatus.

INDUSTRIAL APPLICABILITY

With the optical fiber fixing member and optical fiber array of the present invention, microcracks can be prevented from forming on the lateral surfaces of optical fibers secured in the optical fiber engagement grooves of the optical fiber fixing member, so the transmission loss of light transmitted by the optical fibers can be prevented from decreasing.

In addition, the method for manufacturing optical fiber fixing members and the method for manufacturing optical fiber arrays in accordance with the present invention allow optical fiber fixing members whose peaks have free surfaces and whose optical fiber engagement grooves at the same time have mold transfer surfaces to be manufactured with ease merely by selecting the appropriate molding conditions during molding.

What is claimed is:

1. A method for manufacturing, by means of molding, an optical fiber fixing member having a plurality of optical fiber engagement grooves for positioning and fixing optical fibers, wherein said method for manufacturing an optical fiber fixing member is characterized in that a preform is pressed by a mold provided with convexities and concavities corresponding to said optical fiber engagement grooves and the peaks between the optical fiber engagement grooves such that the preform is forced into the concavities of said mold, the shape of the convexities of said mold is transferred to the preform, and optical fiber engagement grooves whose surfaces are mold transfer surfaces are formed; and the molding material is pressure-molded such that the material fills the concavities of said mold only partially, a state is maintained in which the shape of the bottom portions of the concavities in said mold is not transferred, and peaks are formed between the optical fiber engagement grooves such that the surfaces thereof are free surfaces.

2. The method for manufacturing an optical fiber fixing member according to claim 1, characterized in that a glass preform is used as the molding material, and an optical fiber fixing member made of glass is molded in a heated state.

3. The method for manufacturing an optical fiber fixing member according to claim 2, characterized in that the peak surfaces of the portions described in any of (i) to (iv) below are free surfaces:

(i) Peak surfaces extending all the way in the longitudinal direction of the peaks;

(ii) The peak surfaces on the side of the end face located closer to optical connections (excluding case (i));

(iii) The peak surfaces on the side of the end face opposite the end face located closer to optical connections (excluding case (i));

(iv) The peak surfaces on the side of the end face located closer to optical connections and on the side of the end face opposite the end face located closer to the optical connections (excluding case (i)).

4. A method for manufacturing an optical fiber array, comprising the steps of:

securing optical fibers in the grooves of an optical fiber fixing member having a plurality of optical fiber engagement grooves for positioning and fixing the optical fibers;

pressing said optical fibers in said optical fiber engagement grooves with a pressure plate; and fixedly configuring said optical fiber fixing member, optical fibers, and pressure plate as a unitary structure, wherein said method for manufacturing an optical fiber array is characterized in that a molding material is pressed by a mold provided with convexities and concavities corresponding to said optical fiber engagement grooves and the peaks between the optical fiber engagement grooves such that the molding material is forced into the concavities of said mold, the shape of the convexities of said mold is transferred to the molding material, optical fiber engagement grooves whose surfaces are mold transfer surfaces are formed, a state is maintained in which the molding material fills the concavities of said mold only partially, and an optical fiber fixing member is fabricated by forming peaks between the optical fiber engagement grooves such that, of the surfaces thereof, the portions described in any of (i) to (iii) below are free surfaces;

said optical fibers are sequentially laid out in said optical fiber engagement grooves, starting from the side of the end face located closer to optical connections, in such a way that the tips of the optical fibers extend sufficiently far beyond the end face of said optical fiber fixing member located closer to optical connections, in a state in which the tips of the optical fibers are inclined in relation to said grooves; and the lateral surfaces of said optical fibers are pressed and fixed with said pressure plate;

(i) Peak surfaces extending all the way in the longitudinal direction of the peaks;

(ii) The peak surfaces on the side of the end face located closer to optical connections (excluding case (i));

(iii) The peak surfaces on the side of the end face located closer to optical connections and on the side of the end face opposite the end face located closer to the optical connections (excluding case (i)).

5. A method for manufacturing an optical fiber array, comprising the steps of:

securing optical fibers in the grooves of an optical fiber fixing member having a plurality of optical fiber engagement grooves for positioning and fixing optical fibers;

pressing said optical fibers in said optical fiber engagement grooves with a pressure plate; and fixedly configuring said optical fiber fixing member, optical fibers, and pressure plate as a unitary structure, wherein said method for manufacturing an optical fiber array is characterized in that a molding material is pressed by a mold provided with convexities and concavities corresponding to said optical fiber engagement grooves and the peaks between the optical fiber engagement grooves such that the molding material is forced into the concavities of said mold, the shape of the convexities of said mold is transferred to the molding material, optical fiber engagement grooves whose surfaces are mold transfer surfaces are formed, a state is maintained in which the molding material fills the concavities of said mold only partially, and an optical fiber fixing member is fabricated by forming peaks between the optical fiber engagement grooves such that, of the surfaces thereof, the portions described in any of (i) to (iii) below are free surfaces;

said optical fibers are sequentially laid out in said grooves in the direction from the end face opposite the end face located closer to optical connections toward the end face located closer to the optical connections, in a state in which said optical fibers are inclined in relation to said optical fiber engagement grooves, and the tips of the optical fibers are at a distance from said grooves; and the lateral surfaces of said optical fibers are pressed and fixed with said pressure plate;

(i) Peak surfaces extending all the way in the longitudinal direction of the peaks;

(ii) The peak surfaces on the side of the end face opposite the end face located closer to optical connections (excluding case (i));

(iii) The peak surfaces on the side of the end face located closer to optical connections and on the side of the end face opposite the end face located closer to the optical connections (excluding case (i)).

* * * * *

UNITED STATES PATENT AND TRADEMARK OFFICE
CERTIFICATE OF CORRECTION

PATENT NO.   : 6,324,332 B1
DATED        : November 27, 2001
INVENTOR(S)  : Teruo Yamashita; Masahiro Yoshida; Reikou Fukazaki; Yoshiatsu Yokoo It is certified that error appears in the above-identified patent and that said Letters Patent is hereby corrected as shown below:

<u>Title page,</u>
Item [73], please change "Hoyo Corporation" to -- Hoya Corporation --.

Signed and Sealed this

Twelfth Day of March, 2002

*Attest:*

JAMES E. ROGAN
*Director of the United States Patent and Trademark Office*

*Attesting Officer*